(12) United States Patent
Kitahara et al.

(10) Patent No.: US 7,974,203 B2
(45) Date of Patent: Jul. 5, 2011

(54) TRAFFIC CONTROL SYSTEM, TRAFFIC CONTROL METHOD, COMMUNICATION DEVICE AND COMPUTER PROGRAM

(75) Inventors: Takeshi Kitahara, Fujimino (JP); Masaki Fukushima, Fujimino (JP); Yoji Kishi, Fujimino (JP); Hajime Nakamura, Fujimino (JP)

(73) Assignee: KDDI Corporation, Tokyo (JP)

( * ) Notice: Subject to any disclaimer, the term of this patent is extended or adjusted under 35 U.S.C. 154(b) by 891 days.

(21) Appl. No.: 11/450,079

(22) Filed: Jun. 9, 2006

(65) Prior Publication Data
US 2007/0041323 A1 Feb. 22, 2007

(30) Foreign Application Priority Data

Aug. 16, 2005 (JP) .................................. 2005-235697

(51) Int. Cl.
*H04J 1/16* (2006.01)
(52) U.S. Cl. ......... 370/235; 370/230; 370/231; 370/236
(58) Field of Classification Search .................. 370/466, 370/232, 230, 235, 231, 236
See application file for complete search history.

(56) References Cited

U.S. PATENT DOCUMENTS

| | | | | |
|---|---|---|---|---|
| 6,028,842 A * | 2/2000 | Chapman et al. | ............. | 370/235 |
| 6,286,052 B1 * | 9/2001 | McCloghrie et al. | ......... | 709/238 |
| 6,341,309 B1 * | 1/2002 | Vaid et al. | ...................... | 709/223 |
| 6,457,051 B1 * | 9/2002 | Riddle et al. | .................... | 709/224 |
| 6,502,131 B1 * | 12/2002 | Vaid et al. | ...................... | 709/224 |
| 6,519,636 B2 * | 2/2003 | Engel et al. | .................... | 709/223 |
| 6,578,077 B1 * | 6/2003 | Rakoshitz et al. | ............ | 709/224 |
| 6,591,299 B2 * | 7/2003 | Riddle et al. | .................. | 709/224 |
| 6,990,529 B2 * | 1/2006 | Yang et al. | ..................... | 709/235 |
| 7,028,130 B2 * | 4/2006 | Lueck et al. | .................. | 710/306 |
| 7,092,357 B1 * | 8/2006 | Ye | ................. | 370/230 |
| 7,457,870 B1 * | 11/2008 | Lownsbrough et al. | ...... | 709/224 |
| 7,742,406 B1 * | 6/2010 | Muppala | ....................... | 370/230 |
| 2005/0249125 A1 * | 11/2005 | Yoon et al. | .................... | 370/252 |

FOREIGN PATENT DOCUMENTS

| | | |
|---|---|---|
| JP | 09-205461 A | 8/1997 |
| JP | 2001-298481 A | 10/2001 |

OTHER PUBLICATIONS

"Netnice Network is a Processor", website http://www.netnice.org, BSD Daemon, Copyright 1988 by Marshall Kirk McKusick.

* cited by examiner

*Primary Examiner* — Ricky Ngo
*Assistant Examiner* — Dewanda Samuel
(74) *Attorney, Agent, or Firm* — Edwards Angell Palmer & Dodge LLP; David G. Conlin; David A. Tucker

(57) ABSTRACT

The invention is directed to a traffic control system. The traffic control system comprises a communication device. The communication device includes a traffic type differentiation unit for differentiating a traffic type of an application that generates traffic to be processed on a communication network, a traffic control execution unit for controlling the traffic according to a traffic control condition corresponding to the traffic type, and a setting change reception unit for receiving setting change information on the traffic type or setting change information on the traffic control condition from the communication network. The traffic control system also comprises a setting change information transmission device provided on the communication network for transmitting setting change information.

10 Claims, 6 Drawing Sheets

FIG. 2

| APPLICATION TYPE | TRAFFIC TYPE |
|---|---|
| FTP | TYPE A |
| VoIP | TYPE B |
| WEB | TYPE A |
| ⋮ | ⋮ |
| UNKNOWN | TYPE X |

| CONGESTION LEVEL | TRAFFIC TYPE | TRAFFIC CONTROL CONDITION |
|---|---|---|
| CLASS 1 | TYPE A | BELOW RATE X |
| | TYPE B | BELOW RATE Y |
| | ⋮ | ⋮ |
| | TYPE X | PACKET SPACE Z |
| CLASS 2 | TYPES A, B | BELOW RATE T |
| | ⋮ | ⋮ |
| | TYPE X | BELOW RATE U |
| ⋮ | ⋮ | ⋮ |
| CLASS n | ALL TYPES | PACKET SPACE V |

| PACKET LOSS RATE (L), ROUND TRIP TIME (RTT) | CONGESTION LEVEL |
|---|---|
| L<0.01, RTT<10ms | CLASS 1 |
| L<0.01, 10ms<=RTT<100ms | CLASS 2 |
| 0.01<L<0.1 | CLASS 3 |
| ⋮ | ⋮ |

| TRAFFIC TYPE | TRAFFIC CONTROL CONDITION |
|---|---|
| TYPE A | BELOW RATE X |
| TYPE B | BELOW RATE Y |
| ⋮ | ⋮ |
| TYPE X | PACKET SPACE Z |
| TYPES A, B | BELOW RATE T |
| ⋮ | ⋮ |
| TYPE X | BELOW RATE U |
| ⋮ | ⋮ |
| ALL TYPES | PACKET SPACE V |

32a

TRAFFIC CONTROL SYSTEM, TRAFFIC CONTROL METHOD, COMMUNICATION DEVICE AND COMPUTER PROGRAM

Priority is claimed on Japanese Patent Application No. 2005-235697, filed with the Japanese Patent Office on Aug. 16, 2005, the content of which is incorporated herein by reference.

BACKGROUND OF THE INVENTION

1. Field of the Invention

The invention relates to a traffic control system, traffic control method, communication device, and computer program for controlling communication traffic (called just "traffic" hereinbelow).

2. Description of the Related Art

Recently, many kinds of applications have been used that perform communication because of the spread of the Internet. A plurality of applications such as one for sending and receiving e-mail, gaining access to a Website, exchanging files, and playing a computer game using a communication channel is installed in, for example, one personal computer for operation. Traffic is generated for each application when those applications operate simultaneously. One communication circuit is generally shared as an output circuit for the traffic. Under such circumstances, software is known that is exclusively used for controlling the traffic produced at a communication terminal (for example, a personal computer). See, for example, "Netnice," Retrieved on Aug. 11, 2005 from the World Wide Web: http://www.netnice.org/index-ja.html. The conventional traffic control software is a tool for controlling traffic based on the intention of a user himself at a communication terminal.

The prior art described above can control traffic on the side of the communication terminal, but cannot control traffic generated at the communication terminal, on the side of a communication network. Because of this, for example, communication service, which uses a UDP (User Datagram Protocol) as a protocol, can generate traffic from each communication terminal without being limited to the use rate of a communication network. It is expected that communication capacity of the communication network will be low. Since it is difficult to predict an amount of traffic processed in a communication network, proper facilities and design of communication networks is difficult. Moreover, when a plurality of users shares one communication circuit, occupation of the circuit by a specific application of a specific user cannot be prevented.

For these reasons, it is desirable to control the traffic generated by the specific application of the specific user, on the side of the communication network.

It is considered that traffic produced at a communication terminal can be equally limited. However, when the traffic at a communication terminal is equally limited, QoS (Quality of Service) guarantee demanded by each application cannot be controlled, and sufficient quality of communication service cannot be maintained. There is a need to solve such inconveniences.

SUMMARY OF THE INVENTION

The invention is directed to a traffic control system, a traffic control method and a communication device that satisfy the need, in which the traffic, which is generated at the communication terminal and processed at the communication network, can be controlled on the side of the communication network, and QoS guarantee can be controlled for each application that produces traffic.

The invention is also directed to providing a computer program for realizing the communication device of the invention, making use of a computer.

The traffic control system in accordance with the invention comprises a communication device. The communication device includes a traffic type differentiation unit for differentiating a traffic type of an application that generates traffic to be processed on a communication network; a traffic control execution unit for controlling the traffic according to a traffic control condition corresponding to the traffic type; and a setting change reception unit for receiving setting change information on the traffic type or setting change information on the traffic control condition from the communication network. Moreover, the traffic control system comprises a setting change information transmission device provided on the communication network for transmitting setting change information.

Advantageously, the traffic control condition is set at each congestion level of the communication network, the communication device includes a network state monitoring unit for investigating a congestion level of the communication network, and the traffic control execution unit follows the traffic control condition according to the congestion level of the communication network.

The method of controlling traffic in accordance with the invention comprises differentiating a traffic type of an application that generates traffic to be processed on a communication network; controlling the traffic according to a traffic control condition corresponding to the traffic type; and receiving setting change information on the traffic type or setting change information on the traffic control condition from the communication network.

Preferably, the traffic control condition is set at each congestion level of the communication network, and the method of controlling traffic further comprises investigating a congestion level of the communication network; and following the traffic control condition according to the congestion level of the communication network in a process of controlling the traffic.

The communication device in accordance with the invention comprises a traffic type differentiation unit for differentiating a traffic type of an application that generates traffic to be processed on a communication network; a traffic control execution unit for controlling the traffic according to a traffic control condition corresponding to the traffic type; and a setting change reception unit for receiving setting change information on the traffic type or setting change information on the traffic control condition from the communication network.

Preferably, the communication device further comprises a network state monitoring unit for investigating a congestion level of the communication network; and the traffic control condition is set at each congestion level of the communication network, and the traffic control execution unit follows the traffic control condition according to the congestion level of the communication network.

A computer program in accordance with the invention comprises a function of differentiating a traffic type of an application that generates traffic to be processed on a communication network; a function of controlling the traffic according to a traffic control condition corresponding to the traffic type; and a function of receiving setting change information on the traffic type or setting change information on the traffic control condition from the communication network.

Advantageously, the traffic control condition is set at each congestion level of the communication network, and the computer program further comprises a function of investigating a congestion level of the communication network and a function of following the traffic control condition according to the congestion level of the communication network with respect to controlling the traffic.

According to the invention, the traffic control operation of the communication device can be controlled on the side of the communication network through setting change information. The traffic control conditions can be controlled for each of the traffic types of the applications. This enables the traffic produced at the communication terminal and processed in the communication network to be controlled on the side of the communication network, and also enables QoS guarantee for each application for producing traffic to be controlled.

The traffic control conditions can be controlled at each congestion stage of the communication network. At the same time, because the communication device can determine the congestion stages of the communication network, the traffic control in consideration of a congestion state of the communication network can be realized on the communication device.

BRIEF DESCRIPTION OF THE DRAWINGS

FIG. 2 is a traffic type table for illustrating traffic types in accordance with the first embodiment and a second embodiment of the invention.

FIG. 3 is a traffic control condition table for illustrating traffic control conditions in accordance with the first embodiment of the invention.

FIG. 4 is a congestion level determination table in accordance with the first embodiment of the invention.

FIG. 8 is a traffic control condition table for illustrating traffic control conditions in accordance with the second embodiment of the invention.

DETAILED DESCRIPTION OF THE INVENTION

Each embodiment of the invention will be sequentially described below, referring to the figures.

First Embodiment

Figure 1:
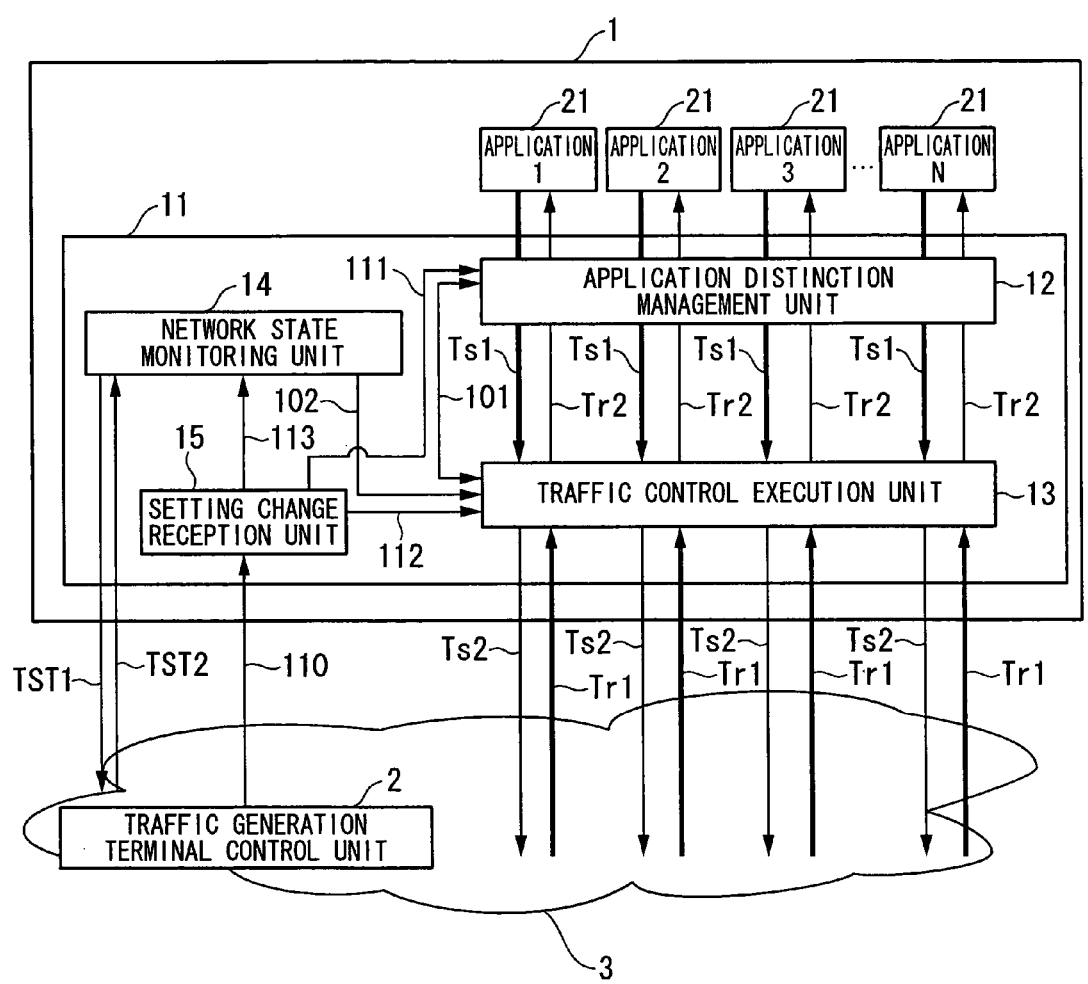
FIG. 1 is a block diagram for illustrating an entire construction of a traffic control system and a construction of a communication terminal (communication device) in accordance with a first embodiment of the invention.

FIG. 1 is a block diagram for illustrating an entire construction of a traffic control system and a construction of a communication terminal 1 (communication device) in accordance with a first embodiment of the invention. The traffic control system shown in FIG. 1 includes the communication terminal 1 connected to a communication network 3 for sending data to or receiving data from the communication network 3, and a traffic generation terminal control device 2 provided with the communication network 3.

The communication terminal 1 shown in FIG. 1 includes a traffic control unit 11. The traffic control unit 11 controls traffic, generated by an application 21, which is to be sent to the communication network 3, and controls traffic, received from the communication network 3, that is to be output to the application 21.

The communication terminal 1 has N applications (where N is an integer more than 1).

Each application 21 produces traffic Ts1 having its own patter. The applications 21 of the first embodiment send or receive a train of packets of TCP (Transmission Control Protocol)/IP (Internet Protocol).

The communication terminal 1 may be, for example, a portable terminal (a portable telephone, and a portable information terminal having communication functions) loaded with applications having communication capabilities such as sending or receiving e-mail and a web browser, and a personal computer having communication functions.

The traffic control unit 11 contains an application distinction management unit 12, a traffic control execution unit 13, a network state monitoring unit 14, and a setting change reception unit 15.

FIG. 2 is a traffic type table for illustrating traffic types in accordance with the first embodiment.

The application distinction management unit 12 (also called a traffic type differentiation unit) differentiates the type of traffic for each of the applications, and includes a traffic type table 31 as shown in FIG. 2. The traffic type table 31 stores traffic types for each of the application types. The application types contain FTP (File Transfer Protocol), VoIP (Voice over Internet Protocol), and WEB, and determines a specified type from a TCP port number in a packet header. The TCP port number and the application types are interrelated beforehand.

The application distinction management unit 12 judges the types of traffic for each of the applications 21 based on the traffic type table 31. The result of the judgment is notified to the traffic control execution unit 13 as traffic control information 101.

The traffic control execution unit 13 controls traffic Ts2 to be sent to the communication network 3 for each of the traffic types. The traffic Ts2 is derived by controlling traffic Ts1 produced at the application 21. The traffic control execution unit 13 also controls traffic Tr2 to be sent to the applications 21 for each of the traffic types. The traffic Tr2 is obtained by controlling traffic Tr1 received from the communication network 3. The types of the traffic Ts1 and Tr1, which are the controlled objects, are informed as the traffic control information 101 from the application distinction management unit 12.

FIG. 3 is a traffic control condition table 32 for illustrating traffic control conditions in accordance with the first embodiment of the invention. The traffic control execution unit 13 includes the traffic control condition table 32 as shown in FIG. 3. The traffic control condition table 32 stores traffic control conditions for each of the traffic types. The traffic control conditions are, for example, a limitation on transmission (output) rate, a transmission (output) interval of packets. In the traffic control condition table 32, the traffic control conditions for each of the traffic types are set for each of congestion levels. The congestion level represents a level as to how much the communication network 3 is congested. The traffic control execution unit 13 receives from the network state monitoring the unit 14 congestion level information 102 that indicates a congestion level.

The traffic control execution unit 13 judges a traffic control condition for each of the traffic types, based on the traffic control condition table 32. Following the traffic control condition derived from the judgment result, the traffic control is executed for each of the traffic types.

It is desirable that control data contained in the traffic be excluded from the traffic controlled objects.

FIG. 4 is a congestion level decision table 33 in accordance with the first embodiment of the invention. The network state monitoring unit 14 investigates a congestion level of the communication network 3, and includes the congestion level decision table 33 as shown in FIG. 4. The congestion level decision table 33 stores a packet loss rate L for each of the congestion levels and round trip time RTT. The packet loss rate L and round trip time RTT are parameters for expressing how the communication network 3 is congested. Other parameters may be used.

The network state monitoring unit 14 sends out a test packet TST1 to the communication network 3, and receives a response TST2 thereto from the communication network 3. Based on the TST2, the packet loss rate L and round trip time RTT are calculated. The result of the calculation determines a congestion level of the communication network 3, based on the congestion level decision table 33. The determination is conveyed to the traffic control execution unit 13 as the congestion level information 102.

The setting change recognition unit 15 receives from the communication network 3 setting change information 110 sent from the traffic generation terminal control device 2. The setting change information 110 is change information for the traffic type table 31, the traffic control condition table 32, and the congestion level decision table 33, and in addition, may contain the change information concerning all the tables of the traffic type table 31, the traffic control condition table 32, and the congestion level decision table 33, or may contain only the change information concerning a part of the tables.

The setting change reception unit 15 instructs the setting change of each of the tables 31, 32, and 33, based on the setting change information 110. A setting change instruction 111 for the traffic type table 31 is sent to the application distinction management unit 12. A setting change instruction 112 for the traffic control condition table 32 is sent to the traffic control execution unit 13. A setting change instruction 113 for the congestion level decision table 33 is sent to the network state monitoring unit 14. Each unit 12, 13, and 14 updates each table 31, 32, and 33, in response to each of the setting change instructions, respectively.

The traffic generation terminal control device 2 (setting change information transmission device) delivers the setting change information 110 to each communication terminal 1 through the communication network 3. The setting change information 110 is determined by, for example, facilities of the communication network 3 and operational situations. A manager of the communication network 3 sets the setting change information 110 at the traffic generation terminal control device 2, and has it delivered.

Figure 5:
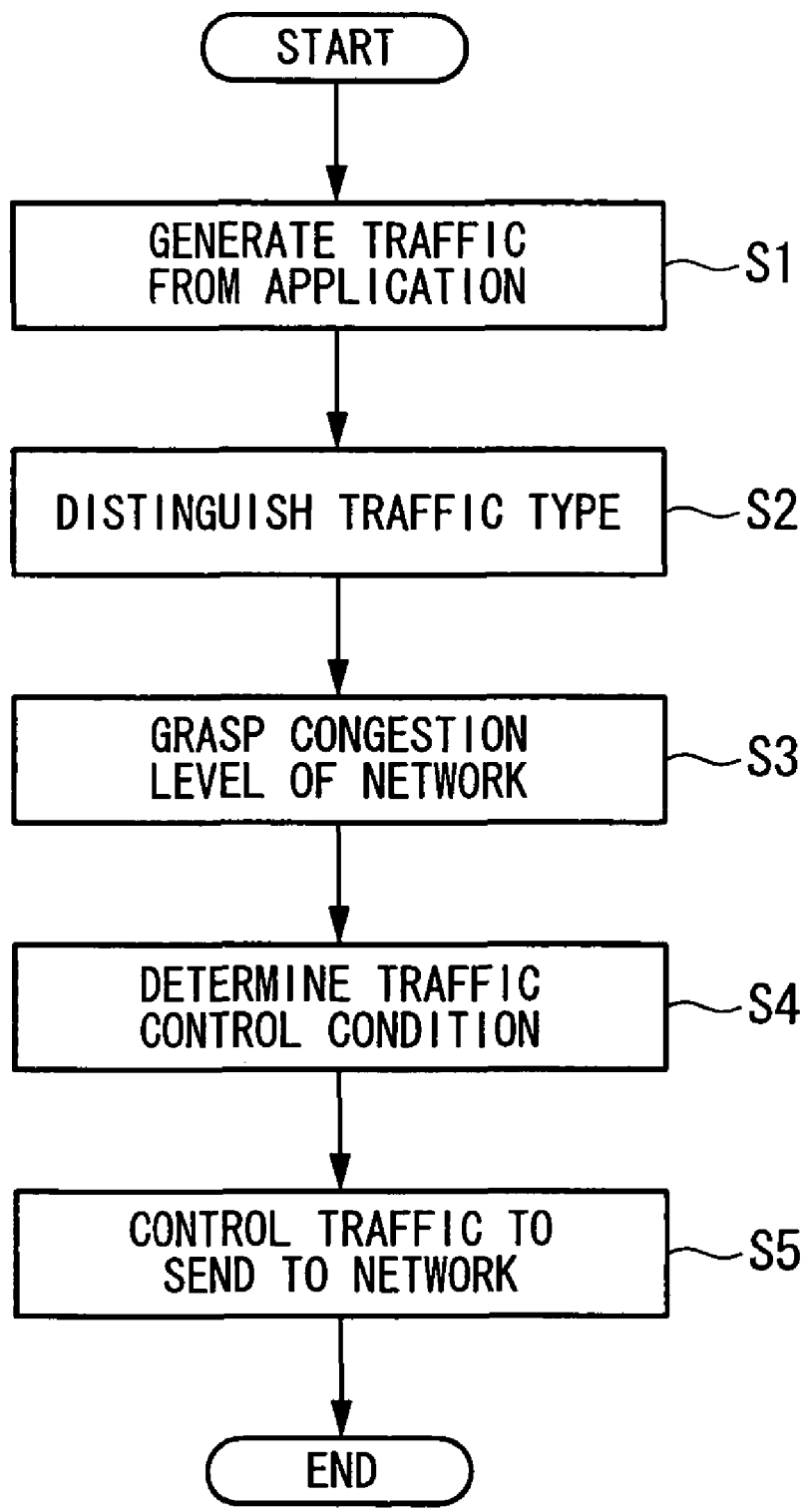
FIG. 5 is a flow chart for illustrating traffic control operation at a time of sending traffic to a communication network in accordance with the first embodiment of the invention.

FIG. 5 is a flow chart for illustrating traffic control operation at a time of sending traffic to a communication network in accordance with the first embodiment of the invention. Referring to FIG. 5, a traffic control operation will be described when traffic is transmitted to the communication network 3.

In FIG. 5, when traffic is generated from an application N_21 (Step S1), the application distinction management unit 12 distinguishes what type the traffic of the application N_21 belongs to (Step S2). In the process of distinguishing the type of traffic, the application distinction management unit 12 distinguishes a type of a predetermined application from a TCP port number in the header of the packet delivered by the application N_21. The traffic type that corresponds to an application type of the determination result is read out from the traffic type table 31. And the read-out traffic type is notified to the traffic control execution unit 13 as the traffic control information 101.

The traffic control execution unit 13 assesses a congestion level of the communication network 3, based on the congestion level information 102 (Step S3). Then, the traffic control execution unit 13 determines a traffic control condition of the traffic type informed by the application distinction management unit 12 (Step S4). In the decision process of the traffic control condition, the traffic control execution unit 13 reads out, from the traffic control condition table 32, the traffic control condition that is at a congestion level of the congestion level information 102 and corresponds to the traffic type informed by the application distinction management unit 12.

Next, the traffic control execution unit 13 operates to send the traffic of the traffic type to the communication network 3, following the traffic control conditions that have been decided (Step S5).

Figure 6:
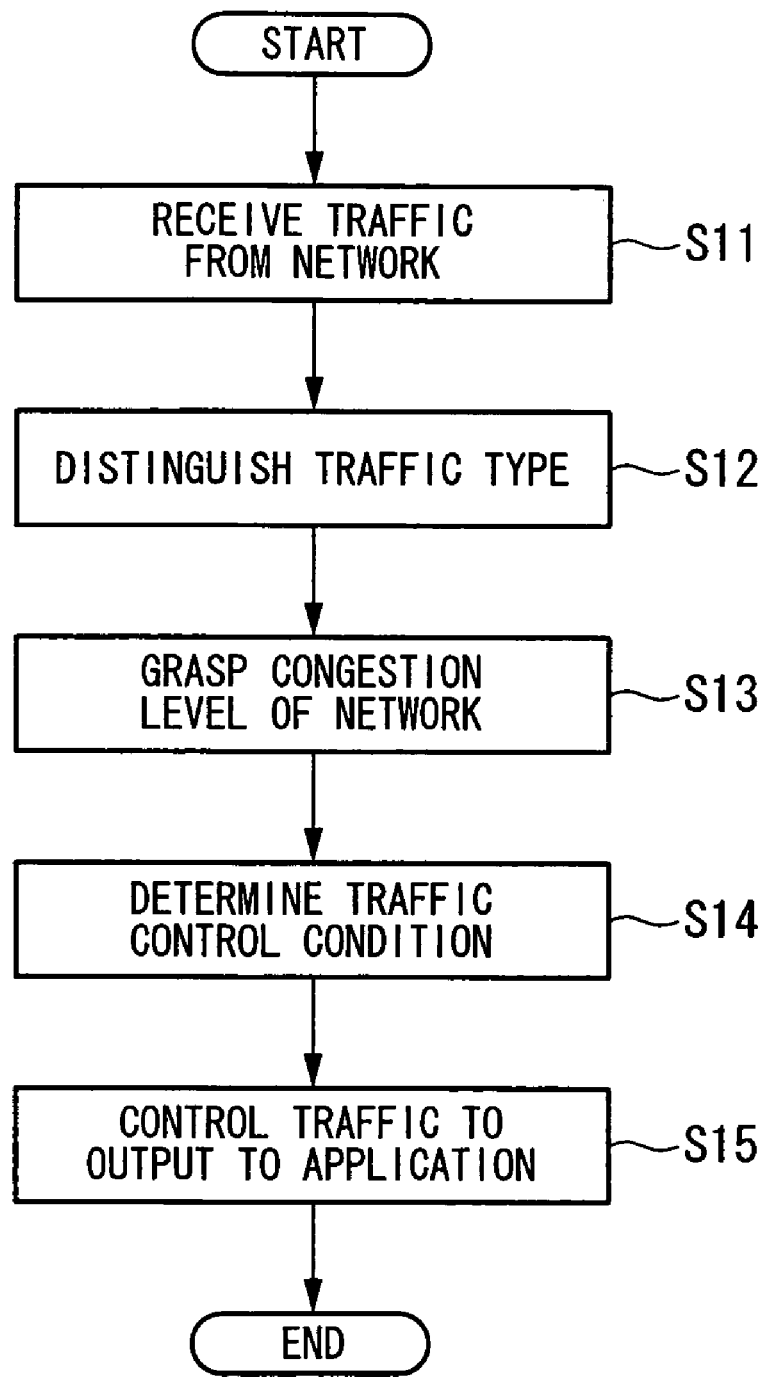
FIG. 6 is a flow chart for illustrating traffic control operation at a time of receiving traffic from a communication network in accordance with the first embodiment of the invention.

FIG. 6 is a flow chart for illustrating a traffic control operation at a time of receiving traffic from the communication network 3 in accordance with the first embodiment of the invention. Referring to FIG. 6, the traffic control operation will be described when the traffic is received from the communication network 3.

In FIG. 6, when the traffic control execution unit 13 receives traffic Tr1 from the communication network 3 (Step S11), it inquires of the application distinction management unit 12 what traffic type the received traffic Tr1 belongs to (Step S12). In the processing of the inquiry about the traffic type, the traffic control execution unit 13 notifies a TCP port number of the packet received to the application distinction management unit 12 as the traffic control information 101. The response (traffic type) from the application distinction management unit 12 is received as the traffic control information 101.

The traffic control execution unit 13 assesses a congestion level of the communication network 3 based on the congestion level information 102 (Step S13). Then, the traffic control execution unit 13 determines a traffic control condition of the traffic type notified by the application distinction management unit 12 (Step S14). In the processing of determining the traffic control condition, the traffic control execution unit 13 reads out, from the traffic control table 32, the traffic control condition that is at a congestion level of the congestion level information 102 and corresponds to the traffic type notified by the application distinction management unit 12.

The traffic control execution unit 13 operates so that the received traffic of the traffic type can be output to the application 21, following the determined traffic control condition (Step S15).

According to the traffic control at the time of receiving the traffic described above, limiting an arrival speed at which the received traffic has arrived at the application 21 and a packet arrival interval can bring about a delay in an acknowledgement response to a communication party from the application 21. As a result of this, traffic which is generated toward the application 21 from the communication party can be constrained by flow control of the TCP.

According to the first embodiment as discussed above, traffic control operation of the communication terminal 1 can be performed by the setting change information 110 from on the side of the communication network 3. Moreover, the traffic control condition can be controlled for each of the traffic types of the application 21. This can control traffic, which is produced at the communication terminal and processed at the communication network, on the side of the communication network, and can control QoS (Quality of Service) guarantee for each of the applications that produce traffic.

According to the first embodiment, the traffic control condition at the communication terminal 1 can be controlled for each of the congestion levels of the communication network 3, and the communication terminal 1 can investigate the congestion level of the communication network 3. Owing to this, traffic control according to a congestion of the communication network 3 can be realized on the communication terminal 1.

Second Embodiment

Figure 7:
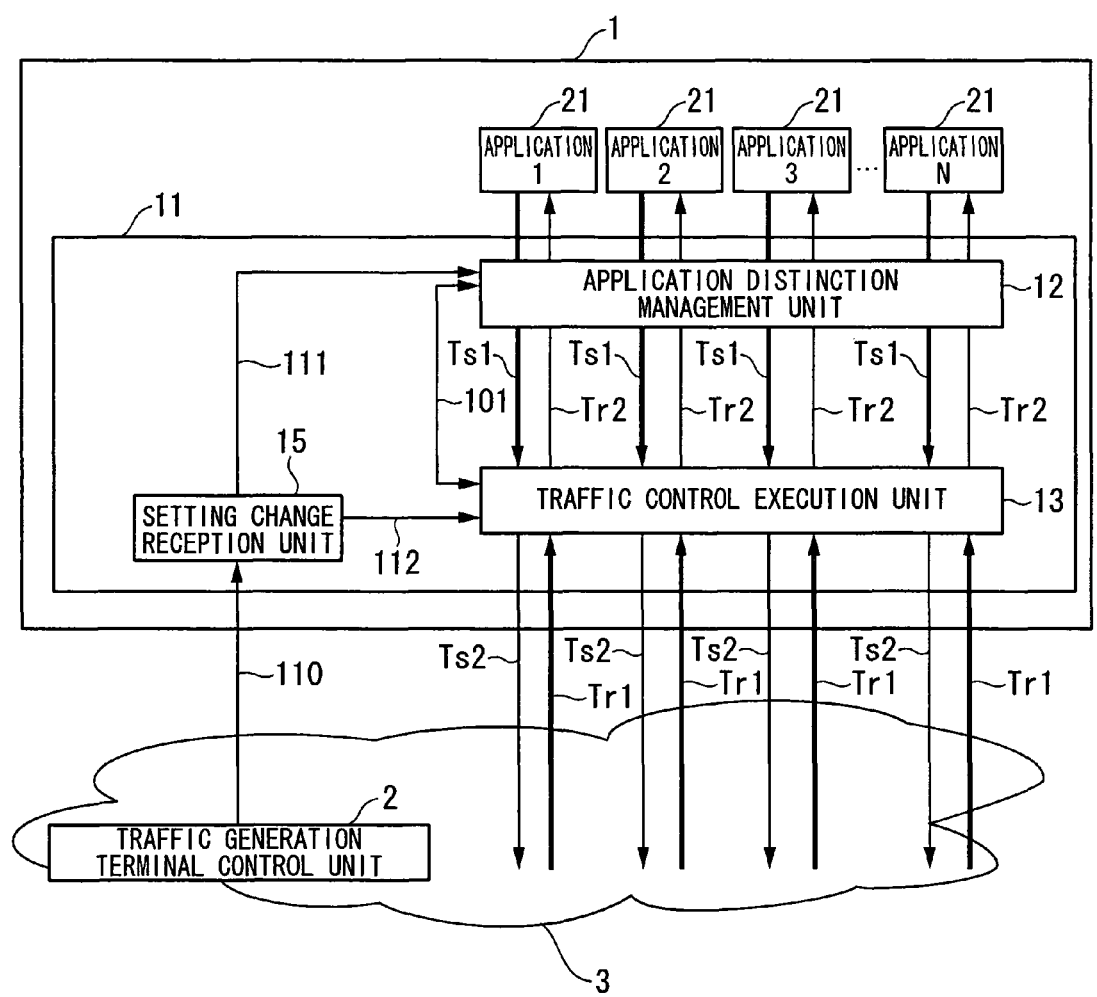
FIG. 7 is a block diagram for illustrating an entire construction of a traffic control system and a construction of a communication terminal (communication device) in accordance with a second embodiment of the invention.

FIG. 7 is a block diagram for illustrating an entire construction of a traffic control system and a construction of the communication terminal 1 (communication device) in accordance with a second embodiment of the invention. Structural elements in FIG. 7 that are the same as those of the first embodiment in FIG. 1 are represented by like reference numerals and will not be repetitiously explained.

In the second embodiment, traffic control conditions are determined independent of a congestion level of the communication network 3. Because of this, no network state monitoring unit 14 shown in FIG. 1 is provided.

FIG. 8 is a traffic control condition table 32a for illustrating traffic control conditions in accordance with the second embodiment of the invention. The traffic control condition table 32a is contained in the traffic control execution unit 13 of FIG. 7. As shown in FIG. 8, the traffic control condition table 32a stores traffic control conditions for each of the traffic types, without discriminating congestion levels.

Even in the second embodiment discussed above, the setting change information 110 can change the traffic type table 31 and the traffic control condition table 32a on the side of the communication network 3. Therefore, it is possible to control traffic control operation of the communication terminal 1 from on the side of the communication network 3. Furthermore, as in the first embodiment, the traffic control condition is that each of the traffic types of the application 21 can be controlled. Because of this, generation of traffic that is generated at the communication terminal 1 and processed at the communication network 3 can be controlled on the side of the communication network 3, and at the same time, QoS guarantee for each of the applications that produce traffic can be controlled.

The first and second embodiments discussed above produce the following advantages.
(1) Since traffic generation can be controlled on the side of the communication network, traffic to be produced can be suppressed into an estimated range even in a best-effort communication service. This can contribute to a stable use of communication networks.

Moreover, because the amount of traffic is easily estimated that will be processed through the communication network, a proper design of the communication network can be made. For example, where packet communication service is provided at a flat rate, excessive traffic is assumed to be produced, which requires larger network facilities to be built and the rate to be increased. However, the embodiments prevent traffic from being produced, which enables proper facilities to be maintained.

(2) Since control according to a traffic type, for example, control at a low rate for less immediate traffic, is possible, usage efficiency of communication networks is improved. Because influence toward other types of traffic can be reduced, improvements in communication quality can be obtained.

Traffic control processing may be conducted in the following way. A program for realizing the function of the traffic control unit 11 shown in FIG. 1 or FIG. 7 is stored in a computer-readable record medium. Then, the program stored in the record medium is read by a computer system to be executed. The "computer system" may be one that contains an OS or hardware for peripheral devices.

The "computer system" contains a home page providing environment (or a display environment) when it is using a WWW system.

The "computer-readable record medium" means a memory device such as a flexible disc, a light magnetic disc, a ROM, a writable nonvolatile memory including a flash memory, a portable medium including a CD-ROM, and a hard disc built in a computer system.

The 'computer-readable record medium' further means one that includes a memory device for holding a program for a fixed time such as a volatile memory inside of a computer system (for example, a DRAM (Dynamic Random Access Memory)) that serves as a server or client when a program is sent through a network such as the Internet or a communication circuit such as a telephone circuit.

Moreover, the program may be one the realizes the function described above in a combination of a program already stored in a computer system, namely, a differential file (differential program).

The embodiments of the invention are described in detail with reference to the figures. However, the structure of the invention is not restricted to the embodiments, and instead includes a design change in a range without going beyond the gist of the invention.

For example, the above embodiments send the setting change information 110 from the communication network 3 to the communication terminal 1. However, the traffic control unit 11 can be installed at the communication terminal 1 with software loaded therein. The software may be replaced by the delivery of other software in updating the traffic control unit 11.

The communication device is not limited to the communication terminal discussed above in the embodiments. For example, a network device for forwarding traffic in a router may include the traffic control unit 11 in accordance with the embodiments described above.

The communication network in accordance with the invention may a wired network or wireless network.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A traffic control system comprising:
   a terminal device including:
      a traffic type differentiation unit for differentiating a traffic type of an application that generates traffic to be processed on a communication network;

a traffic control execution unit for controlling the traffic according to a traffic control condition corresponding to the traffic type; and a setting change reception unit for receiving setting change information on the traffic type or setting change information on the traffic control condition from the communication network; and a setting change information transmission device provided on the communication network for transmitting setting change information;

wherein the terminal device itself is not a node which is deployed in the communication network, the terminal device does not forward any data which are generated by the other terminals, and even though nodes in the communication network also generate data traffic, the data are signaling messages and do not contain any contents generated by users.

2. A traffic control system as recited in claim 1, wherein the traffic control condition is set at each congestion level of the communication network, the terminal device includes a network state monitoring unit for investigating a congestion level of the communication network, and the traffic control execution unit accepts the traffic control condition according to the congestion level of the communication network.

3. A method of controlling traffic comprising:

differentiating a traffic type of an application that generates traffic to be processed on a communication network by a terminal device;

controlling the traffic according to a traffic control condition corresponding to the traffic type by the terminal device; and receiving setting change information on the traffic type or setting change information on the traffic control condition from the communication network by the terminal device, wherein the terminal device itself is not a node which is deployed in the communication network, the terminal device does not forward any data which are generated by the other terminals, and even though nodes in the communication network also generate data traffic, the data are signaling messages and do not contain any contents generated by users.

4. A method of controlling traffic as recited in claim 3, further comprising investigating a congestion level of the communication network by the terminal device, and accepting the traffic control condition according to the congestion level of the communication network in a process of controlling the traffic by the terminal device, and wherein the traffic control condition is set at each congestion level of the communication network.

5. A terminal device comprising:

a traffic type differentiation unit for differentiating a traffic type of an application that generates traffic to be processed on a communication network;

a traffic control execution unit for controlling the traffic according to a traffic control condition corresponding to the traffic type; and a setting change reception unit for receiving setting change information on the traffic type or setting change information on the traffic control condition from the communication network, wherein the terminal device itself is not a node which is deployed in the communication network, the terminal device does not forward any data which are generated by the other terminals, and even though nodes in the communication network also generate data traffic, the data are signaling messages and do not contain any contents generated by users.

6. A terminal device as recited in claim 5, further comprising a network state monitoring unit for investigating a congestion level of the communication network, and wherein the traffic control condition is set at each congestion level of the communication network, and wherein the traffic control execution unit accepts the traffic control condition according to the congestion level of the communication network.

7. A non-transitory digital recording medium that carries a computer program for making a computer realize:

a function of differentiating a traffic type of application that generates traffic to be processed on a communication network by a terminal device;

a function of controlling the traffic according to a traffic control condition corresponding to the traffic type by the terminal device; and a function of receiving setting change information on the traffic type or setting change information on the traffic control condition from the communication network by the terminal device, wherein the terminal device itself is not a node which is deployed in the communication network, the terminal device does not forward any data which are generated by the other terminals, and even though nodes in the communication network also generate data traffic, the data are signaling messages and do not contain any contents generated by users.

8. A non-transitory digital recording medium that carries the computer program as recited in claim 7, further comprising:

a function of investigating a congestion level of the communication network by the terminal device, and a function of accepting the traffic control condition according to the congestion level of the communication network with respect to controlling the traffic by the terminal device, and wherein the traffic control condition is set at each congestion level of the communication network.

9. A non-transitory digital recording medium that carries a computer program comprising:

a first instruction unit for causing a differentiation of a traffic type of application that generates traffic to be processed on a communication network by a terminal device;

a second instruction unit for causing a control of the traffic according to a traffic control condition corresponding to the traffic type by the terminal device; and a third instruction unit for causing a reception of setting change information on the traffic type or setting change information on the traffic control condition from the communication network by the terminal device, wherein the terminal device itself is not a node which is deployed in the communication network, the terminal device does not forward any data which are generated by the other terminals, and even though nodes in the communication network also generate data traffic, the data are signaling messages and do not contain any contents generated by users.

10. A non-transitory digital recording medium that carries the computer program as recited in claim 9 further comprising:

a fourth instruction unit for causing an investigation of a congestion level of the communication network by the terminal device; and a fifth instruction unit for causing an acceptance of the traffic control condition according to the congestion level of the communication network with respect to controlling the traffic by the terminal device, and wherein the traffic control condition is set at each congestion level of the communication network.

* * * * *